United States Patent Office 3,172,908
Patented Mar. 9, 1965

3,172,908
DERIVATIVES OF 3-METHYLVALERIC ACIDS
Eric N. Goldschmidt, Hillside, N.J., assignor to Warner-Lambert Pharmaceutical Company, Morris Plains, N.J., a corporation of Delaware
No Drawing. Original application Mar. 20, 1961, Ser. No. 96,646, now Patent No. 3,120,551, dated Feb. 4, 1964. Divided and this application Aug. 9, 1962, Ser. No. 215,799
5 Claims. (Cl. 260—519)

The present invention relates to new and novel derivatives of 3-methylvaleric acid of the formula:

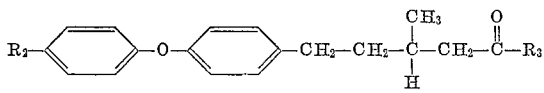

wherein $R_2$ is hydrogen, lower alkoxy, hydroxy, nitro or amino and $R_3$ is hydroxy or a radical of the formula —$A(CH_2)_n$—$R_4$ wherein A is O, NH or S; $n$ is 2 or 3 and $R_4$ is a di-lower alkyl amino, piperidino, pyrrolidino or morpholino group linked to the methylene group through nitrogen.

The present invention also relates to the non-toxic pharmaceutically acceptable acid addition salts of these basic compounds where $R_3$ is a radical of the formula —$A$—$(CH_2)_n$—$R_4$.

The terms "lower alkyl" and "lower alkoxy" as used throughout this specification and in the claims refer to straight and branched chain groups containing 1 to 6 carbon atoms.

This application is a division of my co-pending application Serial No. 96,646, filed March 20, 1961, now Patent No. 3,120,551.

Among the compounds of this invention are

5-[4-(p-nitrophenoxy)phenyl]-3-methylvaleric acid
5-[4-(p-aminophenoxy)phenyl]-3-methylvaleric acid
5-[4-(p-hydroxyphenoxy)phenyl]-3-methylvaleric acid and 5-[4-(p-methoxyphenoxy)phenyl]-3-methylvaleric acid The new and novel compounds of this invention have been found to have interesting pharmacological activity in reducing blood cholesterol levels by virtue of their unique property of inhibiting the biosynthesis of cholesterol. Studies of cholesterol biosynthesis have revealed that cholesterol is synthesized within various body tissues, primarily the liver, in a multi-step synthesis initiated by the acetylation of Coenzyme A with acetyl fragments present in each tissue. The new and novel compounds of this invention are unusually effective in blocking the conversion of acetyl Coenzyme A to cholesterol and its immediate precursors in this biosynthetic route. These compounds are thus valuable agents for use in the control of hyperchloesteremia. In use, these compounds may be formulated with conventional pharmaceutical carriers to dosage unit forms such as tablets, capsules, suppositories, solutions, suspensions and the like.

I have found that 5-[4-(p-nitrophenoxy)phenyl]-3-methylvaleric acid is readily prepared by the reaction of the dipotassium salt of 5-(p-hydroxyphenyl)-3-methylvaleric acid with p-nitrofluorobenzene. 5 - [4 - (p-nitrophenoxy)phenyl]-3-methylvaleric acid may itself be converted to 5-[4-(p-aminophenoxy)phenyl]-3-methylvaleric acid by catalytic reduction, for example by reducing in alcohol with hydrogen over a palladium-on-charcoal or Raney nickel catalyst. In addition, 5 - [4-(p-aminophenoxy)phenyl]-3-methylvaleric acid may be converted to 5 - [4-(p-hydroxyphenoxy)phenyl] - 3-methylvaleric acid by reaction in aqueous sulfuric acid with sodium nitrite to form a diazonium salt which is then hydrolyzed in boiling water-xylene in the presence of copper sulfate and concentrated sulfuric acid.

The compounds of this invention of the formula:

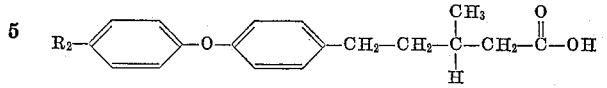

prepared as described above, are readily converted into ester, thiolester or amide derivatives of the formula:

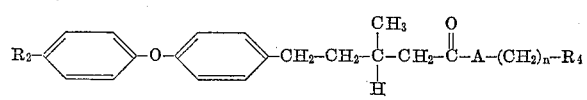

wherein A, $n$ and $R_4$ are as described hereinabove, by reaction of the free acid compound above with thionyl chloride to form the acid chloride of the formula:

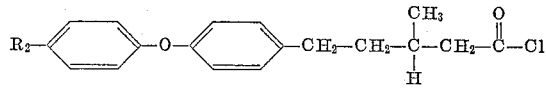

which is, in turn, reacted with an alcohol, thiol or amine of the formula:

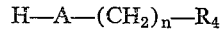

$$H—A—(CH_2)_n—R_4$$

to form the corresponding ester, thiolester or amide derivatives. Alternatively, the ester derivatives of the formula:

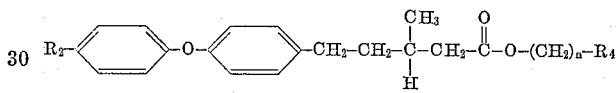

may be prepared by reaction of the free acid with a compound of the formula Cl—$(CH_2)_n$—$R_4$ in the presence of potassium carbonate.

These ester, thiolester and amide derivatives may be used as the free base, or alternately, in the form of their non-toxic pharmaceutically acceptable acid addition salts, for example, the hydrochloride, sulfate, maleate, benzoate, acetate, tartrate, citrate, nitrate, phosphate and the like salts.

Example 1

A suspension of 10.4 g. (50 millimols) of 5-(4-hydroxyphenyl)-3-methylvaleric acid as its di-potassium salt, 200 mg. copper powder and 14.1 g. (100 millimols) of p-nitrofluorobenzene in 150 cc. diethylene glycol dimethyl ether is allowed to reflux for one hour. The clear yellow solution is poured into 100 ml. 6 N HCl and the precipitate filtered. This solid, when recrystallized from cyclohexane containing 10 percent benzene gives a 70 percent yield of 5 - [4-(p-nitrophenoxy)phenyl]-3-methylvaleric acid, melting point=123–124° C.

Analysis.—Calcd.: C, 65.65; H, 5.82; N, 4.25. Found: C, 65.90; H, 5.95; N, 4.15

Example 2

A suspension of 10.5 g. (32 millimols) 5-[4-(p-nitrophenoxy)phenyl]-3-methylvaleric acid and 0.5 g. 10 percent palladium-on-carbon in 300 ml. ethanol is reduced under three atmospheres of hydrogen. After the theoretical amount of hydrogen has been taken up, the suspension is heated, filtered and the solvent removed from the filtrate. The residue is recrystallized from 50 percent benzene-cyclohexane to give a 90 percent yield of 5-[4-(p-aminophenoxy)phenyl] - 3 - methylvaleric acid, melting point=140–141° C.

Analysis.—Calcd.: C, 72.21; H, 7.07; N, 4.68. Found: C, 7.24; H, 6.89; N, 4.88.

Example 3

Into a solution of 25 ml. concentrated hydrochloric acid in 750 ml. water are added 500 grams of zinc and 50 grams of anhydrous mercuric chloride, and the mixture is stirred for 5 minutes at 25 to 27° C. The supernatant solution is decanted. The zinc, after being carefully dried, is immediately added with stirring to a solution of 50 grams of 5-[4-(p-nitrophenoxy)phenyl]-5-oxo-3-methylvaleric acid in 3000 ml. glacial acetic acid contained in a 3-neck flask equipped with equilibrated addition funnel, condenser and stirring motor. During this addition, the heating of the solution is started and the addition of the zinc is followed by the rapid addition of 500 ml. concentrated hydrochloric acid. The solution is now allowed to reach its boiling point as rapidly as possible and is then refluxed for about 25 minutes, after which an additional 500 ml. of concentrated hydrochloric acid is added. On completion of this addition, the mixture is refluxed for an additional 45 minutes, cooled and decanted from the zinc. It is then concentrated to about half its volume at reduced pressure on a steam bath, allowed to cool down to room temperature, and poured into about 2.5 times its volume of ice water. After standing for a while, the suspension is vacuum filtered, pressed dry, and dried in a vacuum oven at about 65° C. for three hours. It is then crystallized twice from Skellysolve B to give 5-[4-(p-aminophenoxy)phenyl]-3-methylvaleric acid. A mixed melting point with the product of Example 2 shows no depression.

*Example 4*

To a cooled fine suspension of 13.5 g. (45 millimols) of 5-[4-(p-aminophenoxy)phenyl]-3-methylvaleric acid in 135 ml. 1 N sulfuric acid, an aqueous solution containing 3.32 g. (47.5 millimols) of sodium nitrite is added dropwise. The resulting solution is stirred in the cold for an additional one hour. Excess nitrous acid is decomposed by the addition of 4.5 g. urea. The resulting solution of the diazonium salt is added to a boiling solution of 135 g. anhydrous copper sulfate and 6.75 ml. concentrated sulfuric acid in 675 ml. water covered by a layer of 250 ml. xylene at a rate to maintain boiling. The reaction is quenched in an ice bath ten minutes after completion of the addition. The organic phase is separated and the aqueous phase extracted with ether. The combined organic phases are washed with dilute aqueous bicarbonate and with water, and then dried over magnesium sulfate and the solvent removed. The residue is recrystallized from 1:1 benzene-cyclohexane to give a 40 percent yield of 5-[4-(p-hydroxyphenoxy)phenyl]-3-methylvaleric acid having a melting point of 90°–91° C.

*Analysis.*—Calcd.: C, 71.98; H, 6.71. Found: C, 72.13; H, 6.95.

*Example 5*

A mixture of 5-[4-(p-methoxyphenoxy)phenyl]-5-oxo-3-methylvaleric acid, glacial acetic acid, concentrated hydrochloric acid and amalgamated zinc is reacted and the reaction mixture is processed as described in Example 3. Yield: 80 percent of theory of 5-[4-(p-methoxyphenoxy)phenyl]-3-methylvaleric acid, boiling point=195–196° C. at 0.1 mm. of mercury, melting point=73–75° C.

*Analysis.*—Calcd.: C, 72.59; H, 7.06. Found: C, 72.65; H, 7.16.

*Example 6*

A solution of 40 millimols of 5[4-(p-methoxyphenoxy)phenyl]-3-methylvaleric acid in 80 ml. glacial acetic acid and 80 ml. of 48 percent aqueous hydrobromic acid is refluxed for two hours. The mixture is cooled and poured into 160 ml. water. The solids are recrystallized from carbon tetrachloride to give an 85 percent yield of 5-[4-(p-hydroxyphenoxy)phenyl]-3-methylvaleric acid. A mixed melting point with the product of Example 4 shows no depression.

It is understood that the foregoing detailed description is given merely by way of illustration and that many variations may be made therein without departing from the spirit of my invention.

Having described my invention, what I desire to secure by Letters Patent is:

1. A compound of the formula:

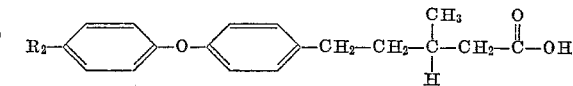

in which $R_2$ is selected from the group consisting of lower alkoxy, hydroxy, nitro and amino.

2. 5-[4-(p-nitrophenoxy)phenyl]-5-methylvaleric acid.
3. 5-[4-(p-aminophenoxy)phenyl]-3-methylvaleric acid.
4. 5-[4-(p-hydroxyphenoxy)phenyl]-3-methylvaleric acid.
5. 5-[4-(p-methoxyphenoxy)phenyl]-3-methylvaleric acid.

References Cited by the Examiner

UNITED STATES PATENTS 2,471,697  5/49  Minlon _____ 260—520

OTHER REFERENCES

Minlon: J. Am. Chem. Soc. 68, 2,488 (1946).

LEON ZITVER, *Primary Examiner.*